United States Patent [19]

James

[11] 3,904,358
[45] Sept. 2, 1975

[54] PROCESS FOR DYEING ACID-MODIFIED NYLON WITH BISCATIONIC AZO DYES

[75] Inventor: Daniel Shaw James, Hockessin, Del.

[73] Assignee: E. I. Du Pont de Nemours and Company, Wilmington, Del.

[22] Filed: May 16, 1973

[21] Appl. No.: 356,908

Related U.S. Application Data

[62] Division of Ser. No. 58,707, July 27, 1970, Pat. No. 3,759,893.

[52] U.S. Cl................ 8/41 B; 8/89; 260/152; 260/154; 260/156; 260/187; 260/207; 260/207.1
[51] Int. Cl.²............ D06P 1/06; D06P 3/24
[58] Field of Search........ 260/152, 156, 207.1, 207; 8/41 B

[56] References Cited
UNITED STATES PATENTS

| | | | |
|---|---|---|---|
| 3,354,182 | 11/1967 | Kühne et al. | 260/152 X |
| 3,532,683 | 10/1970 | Sartori | 260/207 |
| 3,542,758 | 11/1970 | Hegar | 260/156 |

*Primary Examiner*—Floyd D. Higel

[57] ABSTRACT

Orange to violet biscationic azo dyes having the formula

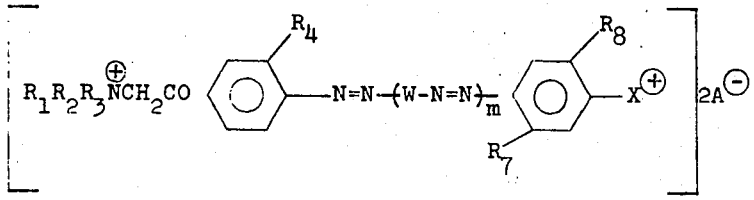

where
$R_1$ = alkyl
$R_2$ = alkyl or hydroxyalkyl
$R_3$ = alkyl, hydroxyalkyl or benzyl
or $R_2$ and $R_3$ together = alicyclic ring or $R_1$, $R_2$, and $R_3$ together = pyridinium ring
$R_4$ = H or Cl
W = 1,4-naphthylene or

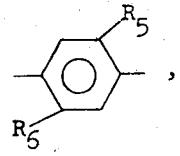

$R_5$ and $R_6$ = H, alkyl, alkoxy or Cl
$R_7$ = H, alkyl, alkoxy, Cl, NHCO alkyl or NHCOC$_6$H$_5$
$R_8$ = H, Cl, alkyl or alkoxy

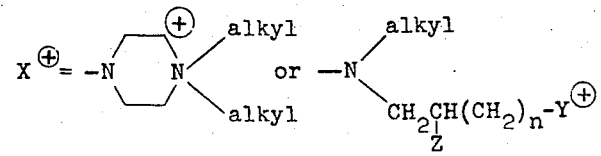

$Y^{\oplus}$ = $N^{\oplus}R_9R_2R_3$ or NHCOCH$_2$N$^{\oplus}$R$_9$R$_2$R$_3$, where
$R_9$ = $R_1$ or H
$m$ = 0 or 1
$n$ = 0 or 1
Z = H when $n$ = 0 and OH when $n$ = 1
$A^{\ominus}$ = anion and where alkyl groups contain 1–4 carbon atoms, are particularly well suited for dyeing of bulk continuous filament (BCF) nylon styling carpet, and have good exhaust and light-fastness on acid-modified nylon and excellent reserve on unmodified nylons, at the preferred dyeing pH range of 6–6.5. The dyes are prepared by coupling p-aminophenacylammonium or p-(p-aminophenylazo)phenacylammonium salts to N,N-disubstituted anilines containing a pendant tertiary amine or quaternary ammonium group attached to the nitrogen atom.

2 Claims, No Drawings

PROCESS FOR DYEING ACID-MODIFIED NYLON WITH BISCATIONIC AZO DYES

This is a division, of application Ser. No. 58,707, filed July 27, 1970 now U.S. Pat. No. 3,759,893.

BACKGROUND OF THE INVENTION

Multicolored bulked continuous filament (BCF) nylon styling carpeting has grown rapidly in popularity since its introduction a few years ago. Such carpeting initially contained several polyamide modifications which differ from each other with respect to the concentration of free amine end groups in the fiber. U.S. Pat. No. 3,078,248 describes the preparation of polyamide fibers of varying amine end content. Since amine groups act as dye sites for acid dyes, these modified nylons vary in acid dye receptivity. Hence, when a carpet composed of three such nylons having low, medium and high amine end content (which may be termed light—, medium— and deep-dyeable nylon, respectively) is dyed with a suitable acid dye or dyes, a three-tone effect is produced. Greater versatility of shade is obtainable by using disperse dyes in addition to acid dyes. Disperse dyes are not site-dyeing (since they possess no ionic groups) and thus dye all nylon modifications of the kind described above to the same depth, irrespective of the amineend concentration. To illustrate this point, one can visualize a tricomponent nylon carpet dyed first with a suitable red acid dye and then with a yellow disperse dye. The red dye will produce light, medium and deep red shades, respectively, on the three different kinds of nylon. the yellow disperse dye, however, will dye all three nylons to the same depth of shade. The resulting shades will be reddish-yellow, orange and scarlet, respectively.

With the introduction of "acid-modified" nylons (e.g. as in U.S. Pat. No. 3,184,436), the range of multicolored effects obtainable on BCF nylon styling carpeting was greatly increased. Acid-modified nylons, which contain sulfonic acid groups on the polymer chain, are dyeable with cationic dyes but have little affinity for acid dyes. Thus, a carpet containing two or three nylons of varying affinity for acid dyes and an acid-modified nylon which reserves (is not stained by) acid dyes can be dyed at will with any combination of shades, including primary colors (those colors that cannot be obtained by mixing other colors together) side by side on the same carpet. Dyeing methods have been developed so that such carpets can be dyed with acid and cationic dyes in a single dyeing operation. Thus, a red cationic dye and a blue acid dye (with a suitable dyebath additive to prevent coprecipitation of the dyes) will produce varying shades of blue on the acid-receptive nylons and a red shade on the acid-modified cationic dye-receptive nylon.

The choice of cationic dyes for acid-modified nylon in styling carpeting depends on two main considerations, namely, a high degree of fastness (particularly to light) on the acid-modified nylon and a lack of staining on the unmodified nylons. The former consideration is self-explanatory, since the fastness requirements for carpet dyes are higher than for almost any other dye end-use; the latter consideration is important since cross-stains can have poor fastness properties and would tend to dull the shade of the acid dyes on the unmodified nylon components and minimize the color contrast between the different types of fiber.

It has been found that the staining of unmodified nylon with cationic dyes depends on the pH at which the dyes are applied to the substrate. Many commercial, monocationic dyes have satisfactory non-staining characteristics on unmodified nylon at low pH (i.e. 4 or below). However, at the preferred dyeing pH range for monocationic dyes of 6–6.5, staining becomes more apparent and, in most cases, tends to become unacceptable for commercial use.

SUMMARY OF THE INVENTION

Nylon styling yarns containing acid-modified nylon and unmodified nylon fibers can be dyed in an aqueous dyebath at a pH of from about 6 to about 6.5 with novel orange to violet biscationic azo dyes having the formula

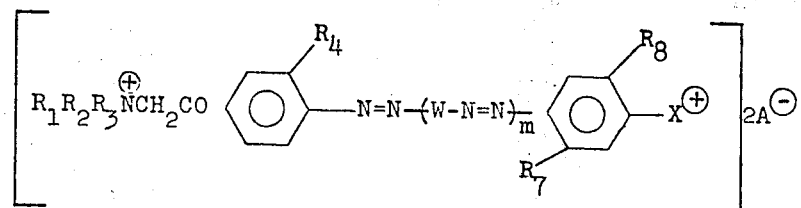

where
$R_1$ = alkyl
$R_2$ = alkyl or hydroxyalkyl
$R_3$ = alkyl, hydroxyalkyl or benzyl
or $R_2$ and $R_3$ together = alicyclic ring
or $R_1$, $R_2$, and $R_3$ together = pyridinium ring
$R_4$ = H or Cl
W = 1,4 -naphthylene or

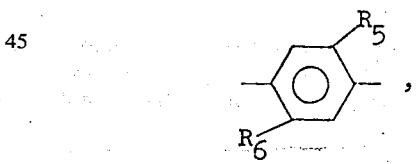

$R_5$ and $R_6$ = H, alkyl, alkoxy or Cl
$R_7$ = H, alkyl, alkoxy, Cl, NHCO alkyl or $NHCOC_6H_5$
$R_8$ = H, Cl, alkyl or alkoxy

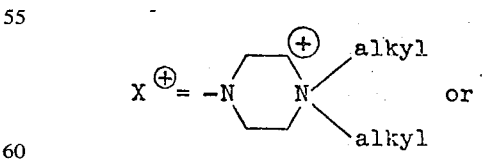

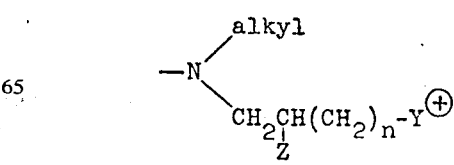

$\overset{\oplus}{Y} = \overset{\oplus}{N}R_9R_2R_3$ or $NHCOCH_2\overset{\oplus}{N}R_9R_2R_3$, where $R_9 =$ $R_1$ or H $m = 0$ or 1

$n = 0$ or 1

$Z = H$ when $n =$ and $OH$ when $n = 1$ $A^{\ominus} =$ anion and where alkyl groups contain 1–4 atoms. The dyes have excellent reserve of non-acid-modified nylon, deep dyeing characteristics on acid-modified nylon and excellent exhaust from the dyebath.

DESCRIPTION OF THE INVENTION

The monoazo dyes of this invention may be prepared by conventional techniques, by diazotizing a monoquaternary diamine of the formula

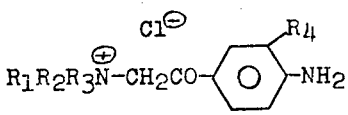

(where $R_1$, $R_2$ and $R_3$ are as defined above) in aqueous hydrochloric acid at about 0°–10°C. with sodium nitrite and coupling the resulting diazonium compound to a quaternary amine or a tertiary amine salt of the structure

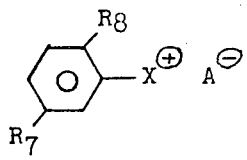

(where the symbols are as defined above). The coupling reaction may be carried out by dissolving the coupler in water at room temperature or below, but preferably at about 5°–20°C., and then slowly adding the diazonium salt preparation to it, or vice versa. To increase the reaction rate, the pH of the reaction mixture may be raised to about 3–4 by adding a suitable inorganic salt or base, such as an alkali metal acetate, carbonate, bicarbonate or hydroxide. Sodium acetate and sodium hydroxide are the preferred agents.

The disazo dyes of this invention may be prepared by coupling the diazo compound, obtained as described above, to a-naphthylamine or an amine of the formula

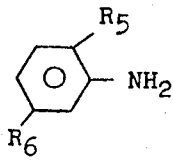

(where $R_5$ and $R_6$ are as defined above. Table 1 lists examples of such amines.

Table 1 aniline
o- or m-toluidene
o- or m-ethylaniline
o- or m-anisidine
o- or m-phenetidine
o- or m-chloroaniline
cresidine
2,5-xylidine
2,5-dimethoxyaniline
2,5-diethoxyaniline
5-chloro-o-toluidine
5-chloro-o-anisidine Coupling may be effected at room temperature or below, but preferably at 10°–15°C., by dissolving the amine totally or partially in aqueous acid and then slowly adding the diazonium salt preparation to the coupler preparation, or vice versa. Adjustment of the pH as described above may be carried out to increase the rate of coupling.

The monoazo amine thus obtained may be diazotized, at room temperature or below, in situ or after first isolating and redissolving or reslurrying the intermediate in aqueous hydrochloric acid. It is then coupled to the final coupler as described above.

The monoazo and disazo dyes thus prepared may be salted from solution if necessary and then isolated by filtration.

Mono- and disazo dyes in which the coupler is the salt of a tertiary amine may be used in this form, or may be quaternized by any of the agents known for this purpose in the art. Common examples include alkyl chlorides, bromides and iodides, benzyl chloride, bromide and sulfate, alkyl sulfates and alkyl p-toluenesulfonates. Alkyl may contain up to four carbon atoms, but methyl and ethyl are the preferred species.

Another alternative procedure for preparing the subject dyes is by diazotizing p-aminophenacyl chloride or 4-amino-3-chlorophenacyl chloride and coupling as described above to give mono- or disazo intermediates. These compounds may then be treated with a tertiary amine to give the desired products.

For economic reasons, the preferred anion is chloride. However, substitution of other anions in no way impairs the desirable properties of the subject dyes and in some cases (i.e. for ease of isolation of the dye) may be beneficial. Various procedures are available for introducing other anions. For instance, salts such as zinc chloride, sodium iodide, sodium fluoborate, etc., may be used as salting agents to precipitate the biscationic dyes as the zinc chloride double salt, the iodide and the fluoborate, respectively. Hydrochloric acid may be replaced with sulfuric acid in the procedures described above to produce the sulfate form of the dyes. Quaternization of the coupler compounds, before or after dye formation, may be effected by any of the agents known in the art for this purpose. Thus may such anions as bromide, methosulfate and p-toluenesulfonate be introduced. Picrate and phosphate are two more potentially desirable anions.

The preparation of the starting monoquaternary diamines is described in U.S. Pat. No. 2,821,526. Acetanilide is reacted with chloroacetyl chloride in the presence of aluminum chloride to give p-acetamidophenacyl chloride. Reaction of this material with a suitable tertiary amine, followed by removal of the N-acetyl group by acid hydrolysis, produces the desired monoquaternary amine. Examples of such diamines are given in Table 2.

Table 2

(p-aminophenacyl)trimethylammonium chloride
(p-aminophenacyl)triethylammonium chloride
(p-aminophenacyl)tri-n-propylammonium chloride
(p-aminophenacyl)tri-n-butylammonium chloride
(p-aminophenacyl)dimethyl2-hydroxyethyl)ammonium chloride
(p-aminophenacyl)diethyl(2-hydroxyethyl)ammonium chloride
(p-aminophenacyl)ethylbis(2-hydroxyethyl)ammonium chloride (p-aminophenacyl)methylbis(hydroxyisopropyl)ammonium chloride
(p-aminophenacyl)benzyldimethylammonium chloride
(p-aminophenacyl)benzylmethyl(2-hydroxyethyl)ammonium chloride
(p-aminophenacyl)ethylpiperidinium chloride
(p-aminophenacyl)methylpyrrolidinium chloride
(p-aminophenacyl)pyridinium chloride
(4-amino-3-chlorophenacyl)trimethylammonium chloride The couplers are also prepared by known techniques from N-alkylanilines or *m*-chloro, *m*-alkyl or *m*-alkoxy derivatives thereof, e.g. by sequential reaction with ethyleneimine, chloroacetyl chloride and a secondary or tertiary amine; by reaction with ethylene oxide, replacement of the resulting hydroxyl group with chlorine and subsequent reaction with a secondary or tertiary amine; reaction with epichlorhydrin and then a secondary or tertiary amine; reaction with epichlorhydrin, replacement of the terminal chlorine atom with a primary amine group and then sequential reaction with chloroacetyl chloride and a secondary or tertiary amine, and so on. Other useful couplers are prepared by alkylating and quaternizing N-phenylpiperazine, or the *m*-chloro, *m*-alkyl or *m*-alkoxy derivatives thereof, with any of the known quaternizing agents, examples of which are given above. Examples of such couplers are given in Table 3.

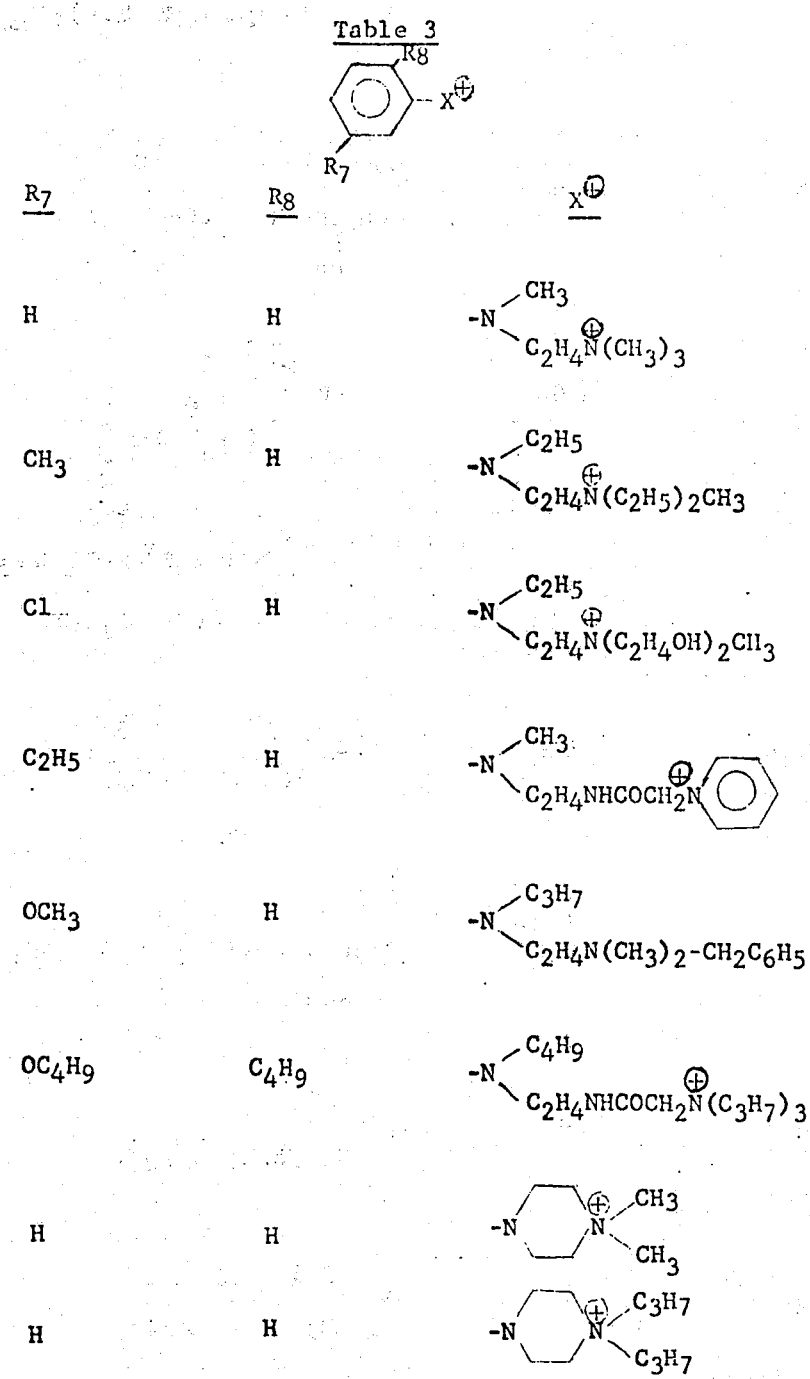

Table 3 (Cont'd.)
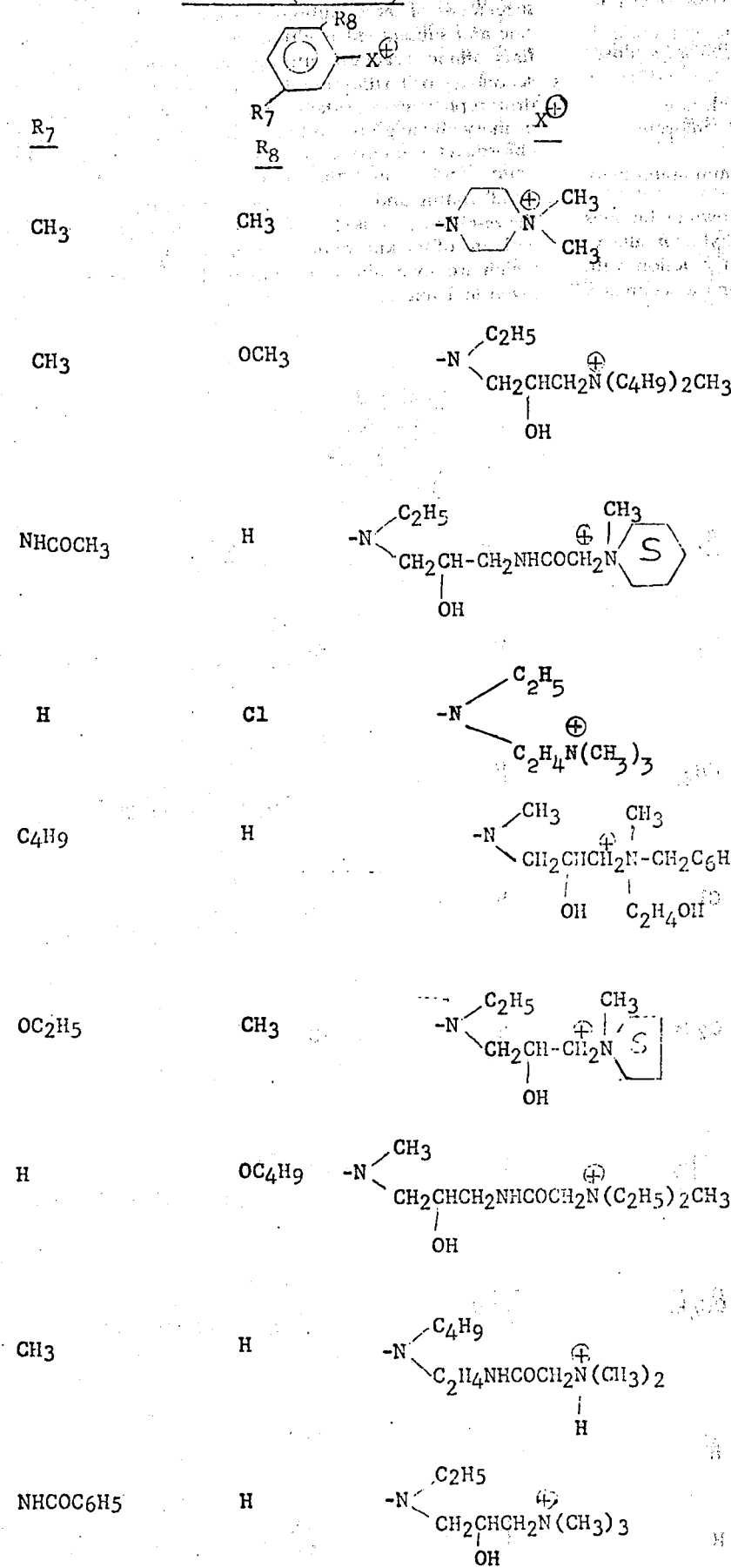
| R7 | R8 | X⊕ |
|---|---|---|
| CH3 | CH3 | -N(piperidine)⊕(CH3)2 |
| CH3 | OCH3 | -N(C2H5)CH2CHCH2N⊕(C4H9)2CH3, with OH on middle C |
| NHCOCH3 | H | -N(C2H5)CH2CH(OH)CH2NHCOCH2N⊕(CH3)(thiane) |
| H | Cl | -N(C2H5)C2H4N⊕(CH3)3 |
| C4H9 | H | -N(CH3)CH2CHCH2N⊕(CH3)(CH2C6H5)(C2H4OH), with OH on middle C |
| OC2H5 | CH3 | -N(C2H5)CH2CH(OH)CH2N⊕(CH3)(thiane) |
| H | OC4H9 | -N(CH3)CH2CH(OH)CH2NHCOCH2N⊕(C2H5)2CH3 |
| CH3 | H | -N(C4H9)C2H4NHCOCH2N⊕(CH3)2(H) |
| NHCOC6H5 | H | -N(C2H5)CH2CH(OH)CH2N⊕(CH3)3 |

The biscationic azo dyes of this invention have been found to have good exhaust and lightfastness on acid-modified BCF nylon fibers. Such polymers are described, for instance, in U.S. Pat. No. 3,184,436 and contain sulfonate groups along the polymer chain which act as dye sites for basic or cationic dyes. The instant dyes have also been found to display an almost total lack of affinity for unmodified nylon fibers under neutral to weakly acidic conditions. In other words, at pH 6–6.5, the biscationic dyes almost completely reserve nylon fibers which do not contain sulfonate groups. This behavior differs from that of known monocationic orange and red dyes, which tend to stain unmodified nylon under near-neutral conditions and which display good reserve only under more acidic conditions (i.e. pH 4 or below).

The importance of these observations lies in the fact that nylon styling carpeting, which contains acid-modified and unmodified nylons, is piece-dyed most satisfactorily at pH 6–6.5. Acid and cationic dyes are applied to the carpeting from a single dyebath, which contains an additive to prevent coprecipitation of the oppositely charged dye molecules. There are several reasons why neutral to weakly acidic conditions are preferred for this dyeing procedure.

a. Although cationic dyes generally reserve unmodified nylons more efficiently at lower pH, they do not exhaust as well from the dyebath onto acid-modified nylon.

b. Acid dyes generally exhaust more efficiently at lower pH, but suffer a decrease in levelness on unmodified nylon and tend to stain acid-modified nylon.

c. Styling carpet that has a jute backing undergoes increased staining of the nylon, by impurities in the jute, with increasing acidity, causing dulling of dye shade and deterioration of dye fastness properties.

At neutral to weakly acidic conditions, cationic dyes may be applied to nylon styling carpet in conjunction with neutral-dyeing acid dyes, which have satisfactory exhaust and levelness under these conditions. It has now been discovered that the biscationic dyes described hereinabove have significantly better non-staining properties on unmodified nylon at pH 6–6.5 than any known commercial orange to red cationic dye.

Although biscationic dyes have been disclosed in the patent literature for several years for use on various substrates, particularly for acid-modified acrylic fibers, biscationic dyes like those disclosed in the present invention were found to have very limited utility on acrylics (such as those disclosed in U.S. Pat. No. 2,837,500 and U.S. Pat. No. 2,837,501) because of low affinity and poor buildup on the substrates. Much the same thing was found to be true of acid-modified polyester (such as is disclosed in U.S. Pat. No. 3,018,272). Thus, it was totally unexpected to find that the biscationic dyes of this invention have entirely adequate buildup on acid-modified nylon, producing deep orange to violet shades thereon.

Commercial nylon styling carpet usually contains acidmodified nylon and from two to four unmodified nylons of varying acid dye receptivity which are tufted onto a backing in a random pattern to give the desired styling effects. The acid dye receptivity of the unmodified nylon fibers is a function of their amine end content, which may range from 5 to more than 100 gram-equivalents of free amine ends per $10^6$ grams of polymer. Four unmodified nylon fibers in the same styling yarn may have the following amine-end content:

1. 5–25 gram-equivalents — "light-dyeable" with acid dyes
2. 25–55 gram-equivalents — "medium-dyeable" with acid dyes
3. 55–100 gram-equivalents — "deep-dyeable" with acid dyes
4. 100–120 gram-equivalents — "ultradeep-dyeable" with acid dyes The deep-dyeing nylons (3) and (4) are disclosed in U.S. Pat. No. 3,078,248.

The carpeting can be dyed with acid and cationic dyes in the same dyebath by using as a dyeing assistant a sulfobetaine of the general structure

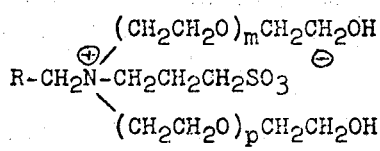

where R = aliphatic hydrocarbon radical of 7–17 carbon atoms
$m = 3-3$
$p = 0-3$
$(m+p) = <4$ The preparation of these compounds is described in U.S. Pat. No. 3,280,179. Their utility in this particular end-use is disclosed in the defensive publication of Robbins dated 4-29-69, Ser. No. 634,477. The functions of the sulfobetaine additive are to prevent coprecipitation of the acid and cationic dyes, to enhance the levelness of both classes of dye without suppressing buildup and to minimize cross-staining.

Piece dyeing is carried out at temperatures above 70°C. and preferably near the boil (95°–100°C.). Lower temperatures cause inferior exhaust and poor contrast through cross-staining. The pH of the dyebath may be anywhere from 3 to 9, but the most favored pH range is 6–6.5, for reasons given earlier in the discussion.

The sulfobetaine dyeing assistant may be used in amounts as low as 0.05% of the weight of the fiber being dyed, but the best results are obtained with 0.2–0.3%. Amounts in excess of 0.5% of the weight of the fiber have led to an increase in cross-staining.

The dyeing procedure is advantageously preceded by a bleach scour, as described in Example 17 (a), in order to obtain maximum shade brightness and contrast.

Finally, dyeing is usually followed by conventional rinse and drying steps. Conventional finishing, drying, latexing, and double backing application may be performed by customary means.

The aforementioned dyeing procedure may be adapted for the continuous dyeing of styling carpet, a comparatively new technique which is referred to in "Melliand Textilberichte," 48, 415–448 (April, 1967).

Continuous dyeing is taught as being related to piece dyeing in that it is an aqueous process, but a. at very low bath ratios, i.e. 5:1 instead of 30:1 to 50:1, and b. the rate of fixation is much faster, since temperatures near the boil are attained more quickly in a steamer than in heating up a beck. Cationic and acid or direct dyes may also be printed onto nylon styling carpeting, with excellent results.

Although the discussion has been devoted up to this point to styling carpeting, there are other areas in which BCF nylon styling yarns may be effectively used, such as upholstery and accent or throw rugs. The dyeing of these items may be carried out by the same means as that described for carpeting, using suitable equipment. Thus, carpeting is usually dyed in becks; upholstery is usually dyed in jigs; accent or throw rugs are usually dyed in paddle machines.

In order to evaluate the instant biscationic dyes for use on nylon styling yarns, they were dyed singly and in the absence of any acid dyes, onto a skein of acid-modified, 1300 denier BCF nylon (such as is described in U.S. Pat. No. 3,184,436) in the presence of a skein of "light-dyeable," unmodified, 3700 denier BCF nylon having an amine-end content of 5–25 gramequivalents per $10^6$ grams of polymer. The dyeing procedure was the same as that described in Example 17 and the evaluation of cross-staining and light-fastness for some typical dyes of this invention appears in Example 20.

EXAMPLES

The preparation of the dyes of this invention may be illustrated by the following examples. Parts are given by weight.

EXAMPLE 1

Coupling of (p-Aminophenacyl)trimethylammonium Chloride ("Quatamine") to [2-(N-ethyl-m-toluidino)ethylcarbamoylmethyl]trimethylammonium Chloride A solution of 22.9 parts of "Quatamine" in 250 parts of water and 35 parts of 10 N-hydrochloric acid was cooled to 5°–10°C. and treated with 23.5 parts of 5N-sodium nitrite solution. After stirring at this temperature for a ½ hour, excess nitrous acid was destroyed with a small quantity of sulfamic acid. The diazo preparation was added over a period of 15 minutes to a solution of 32.9 parts of the coupler in 100 parts of water at 10°–15°C., containing enough acetic acid to give the solution a pH of 5.0. As coupling proceeded, the pH was maintained at 3.5–4.0 by intermittent addition of sodium acetate. The reaction mixture was stirred for 2 hours at 10°–15°C., after which the temperature was allowed to rise to room temperature. The solution was then heated to 50°–60°C. and 110 parts of sodium iodide were added in portions. Precipitation of the dye occurred.

The temperature was allowed to fall to room temperature and the reaction mass was stirred at this temperature overnight. The solids were isolated by filtration, washed with 500 parts of 10% sodium iodide and then with 500 parts of isopropanol and dried. The chromatographically pure, reddish-orange powder had an absorptivity of 42.5 liters gram$^{-1}$ cm.$^{-1}$ at 490 m$\mu$ (in dimethylacetamide : water = 4 : 1).

Found: C, 43.8, 43.6; H, 5.7, 5.8; Azo N, 3.9, 4.0; I, 35.2, 35.0. Calc. for $C_{27}H_{42}N_6O_2I_2$: C, 44.1; H, 5.7; Azo N, 3.8; I, 34.5.

On the basis of the above results, the structure of the dye is

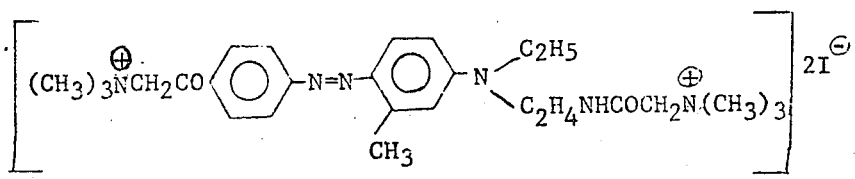

EXAMPLE 2

Coupling of (p-aminophenacyl)pyridinium Chloride to the Coupler of Example 1

In the procedure of Example 1, 22.9 parts of "Quatamine" were replaced by 24.9 parts of (p-aminophenacyl)pyridinium chloride. The dye was salted from solution by addition of sodium fluoroborate. An oil was formed initially which solidified on stirring the reaction mass at 45°–50°C. for 15 minutes. After stirring overnight at room temperature, the solids were filtered, washed with 500 parts of 5% sodium fluoroborate solution and then with 500 parts of isopropanol, and dried. The chromatographically pure red solid had an absorptivity of 53.5 liters gram$^{-1}$ cm.$^{-1}$ at 488 m$\mu$ (in dimethylacetamide : water = 4 : 1).

Based on the above procedure, the structure of the dye is

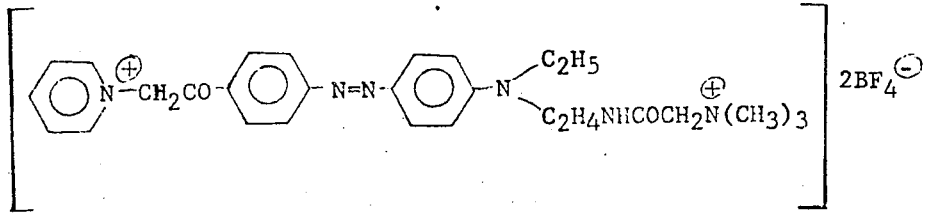

EXAMPLE 3

Coupling of "Quatamine" to N-ethyl-N-(m-tolyl)-N',N'-diethyl-2-hydroxy-1,3-propylenediamine 15.1 Parts of "Quatamine" were diazotized in a conventional manner, essentially as described in Example 1. The diazonium salt solution was added to a suspension of 18.5 parts of coupler in 25 parts of water adjusted to pH 5 with acetic acid and cooled at 5°–10°C. The pH was maintained at about 5 during the coupling procedure by addition of sodium acetate. The reaction mixture was then stirred for ½ hour and then warmed to 25°–30°C. The product was salted out of solution by the addition of 23 parts of sodium iodide, isolated by filtration, washed with 5% sodium iodide solution and then with a little water, and dried. The dark red powder had an absorptivity of 48.5 liters gram$^{-1}$ cm.$^{-1}$ at 495 mµ.

Based on the above procedure the structure of the dye is

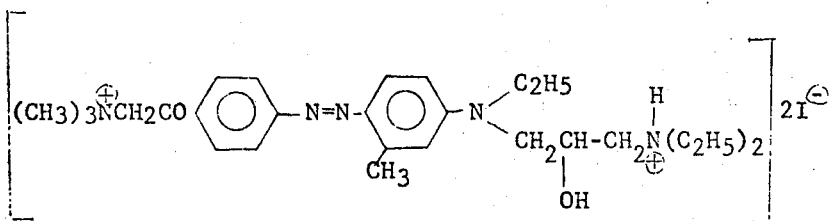

EXAMPLE 4

Quaternization of the Dye of Example 3

A mixture of 15 parts of the dye of Example 3, 17 parts of methyl iodide, 4.6 parts of potassium carbonate and 200 parts of isopropanol was heated to the reflux temperature with stirring for 6 hours. An additional 11.5 parts of methyl iodide was then added and the reaction mixture stirred at the reflux temperature for a further 4 hours. After allowing the mass to cool by stirring overnight, the product was separated by filtration, washed with isopropanol and dried. The dye had an absorptivity of 28.5 liters gram$^{-1}$ cm.$^{-1}$ at 488 mµ.

Based on the above procedure, the structure of the dye is

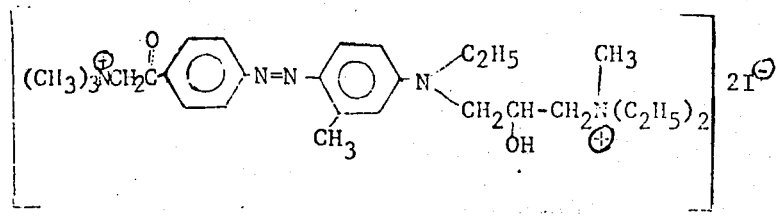

EXAMPLE 5

Coupling of "Quatamine" to [3-(N-ethyl-m-toluidino)-2-hydroxypropyl]trimethylammonium chloride 20.4 Parts of "Quatamine" were diazotized by the procedure described in Example 1. 72 Parts of the coupler were then added at 5°–10°C. and the reaction mixture stirred at this temperature for 1 hour. The temperature was then allowed to rise to 20°–25°C. over a period of 2 hours. The pH of the reaction mass was adjusted to 3–4 with sodium acetate and 26 parts of sodium fluoborate were added. The reaction mass was stirred for 2 ½ hours and the solids were isolated by filtration, washed with 250 parts of 10% sodium fluoborate and then with 120 parts of isopropanol and finally dried. Yield: 44 parts of red needles, having an absorptivity of 53.0 liters gram$^{-1}$ cm.$^{-1}$ at 489 mµ.

Based on the above procedure, the structure of the dye is

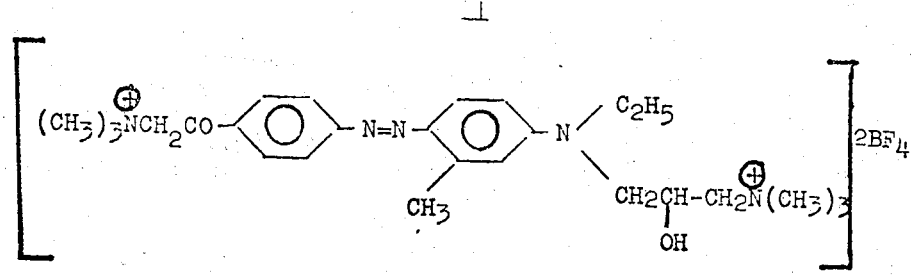

EXAMPLE 6

Coupling of (p-aminophenacyl)dimethyl(2-hydroxyethyl)ammonium chloride to the coupler of Example 3

Diazotization of 15.5 parts of (p-aminophenacyl)dimethyl-(2-hydroxyethyl)ammonium chloride was carried out essentially as described in Example 1.

To the diazonium salt solution was added 17.2 parts of the pure coupler of Example 3 over a 15–20 minutes period. The reaction mixture was stirred at 10°–15°C. for 2 hours and then allowed to warm to room temperature. After stirring for a further 2 hours, 30% sodium hydroxide solution was added to raise the pH to 4 and the temperature raised to 50°–55°C. Addition of 25 parts of sodium fluoroborate caused the dye to precipitate as an oil, which crystallized on stirring the reaction mass overnight at room temperature.

The solids were isolated by filtration, restirred in 100 parts of 20% sodium fluoroborate solution, reisolated, washed with 10% sodium fluoroborate solution and dried. The chromatographically pure orange powder had an absorptivity of 44.4 liters gram$^{-1}$ cm.$^{-1}$ at 438 m$\mu$. Based on the above procedure the structure of the dye is

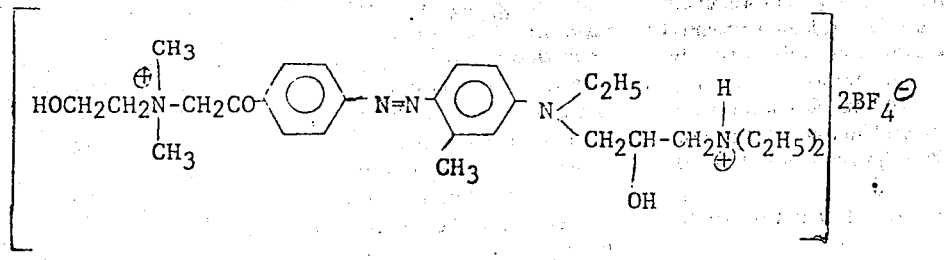

EXAMPLE 7

Coupling of (p-aminophenacyl)pyridinium Chloride to N'-phenyl-N,N-dimethylpiperazinium Iodide A solution of 7 parts of (p-aminophenacyl)pyridinium chloride in 75 parts of water and 7 parts of 10N-hydrochloric acid were treated with 7.3 parts of 5N-sodium nitrite at 0°–5°C. After stirring the reaction mixture for a ½ hour, excess nitrous acid was destroyed with sulfamic acid. The diazo preparation was added to a mixture of 9.2 parts of the coupler and 100 parts of water, the mixture being first adjusted to pH 4 with acetic acid and cooled to 5°–10°C. Sodium acetate as added during the coupling reaction to maintain the pH of the reaction mixture at 4–4.5. The mixture was stirred for 1 ½ hours at ca. 10°C. and then overnight at room temperature. The solids were isolated by filtration and washed with 20 parts of water and then 50 parts of isopropanol. The dark brown dye was slurried in 50 parts of isopropanol, isolated by filtration, washed with isopropanol and dried. The chromatographically pure tinctorially weak dye had a shoulder at 360 m$\mu$, where the absorptivity was 19.6 liters gram$^{-1}$ cm.$^{-1}$.

Based on the above procedure the structure of the dye is

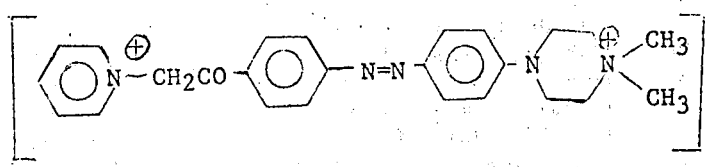

(where A is Cl$^{\ominus}$ and/or I$^{\ominus}$).

EXAMPLE 8

Coupling of "Quatamine" to (a) cresidine (b) 2,5-dimethoxyaniline (c) m-toluidine Diazotization of 68.5 parts of "Quatamine" was carried out as in Example 1. The resulting solution of the diazonium salt was divided into three equal parts.

a. To the first part was added a partial solution of 13.6 parts of cresidine in 50 parts of water containing enough acetic acid to dissolve about half of the cresidine. The reaction mixture was stirred at 10°–15°C. for 4 hours and then overnight at room temperature. Filtration yielded solids which were washed with 200 parts of 20% salt solution, 200 parts of 10% salt solution, 200 parts of 5% salt solution and finally with 100 parts of isopropanol. After being dried, the red powder was found to have an absorptivity of 68.5 liters gram$^{-1}$ cm$^{-1}$ at 488 m$\mu$. The structure of the intermediate is:

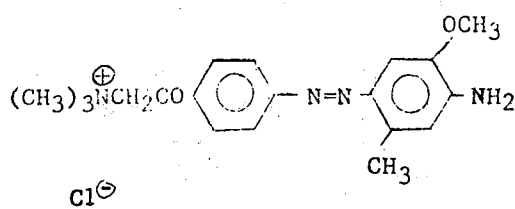

b. The second part of the diazo preparation was treated with 15.2 parts of 2,5-dimethoxyaniline, essentially as described in (a) above. The resulting brown powder had an absorptivity of 62.5 liters gram$^{-1}$ cm.$^{-1}$ at 490 m$\mu$.

The structure of the intermediate is:

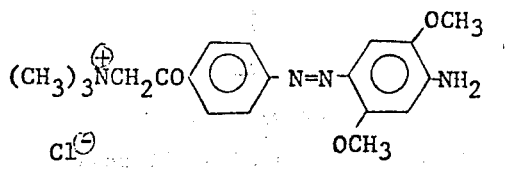

c. The third portion of the diazo preparation was treated with 12 parts of m-toluidine, as described in (a) above. The resulting orange powder had an absorptivity of 70.3 liters gram$^{-1}$ cm.$^{-1}$ at 454 m$\mu$. The structure of the intermediate is

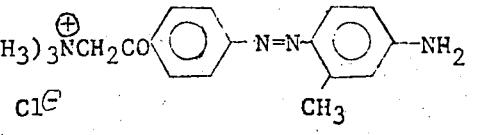

EXAMPLE 9

Coupling of the Monoazo Intermediates of Example 8 to N'N'-Diethyl-N-ethyl-N-(m-tolyl)ethylenediamine a. Diazotization of 16.5 parts of the intermediate from Example 8 a) was effected in aqueous hydrochloric acid at 10°–15°C., using a 25% molar excess of sodium nitrite. After 1 ½ hours, excess nitrous acid was destroyed with sulfamic acid.

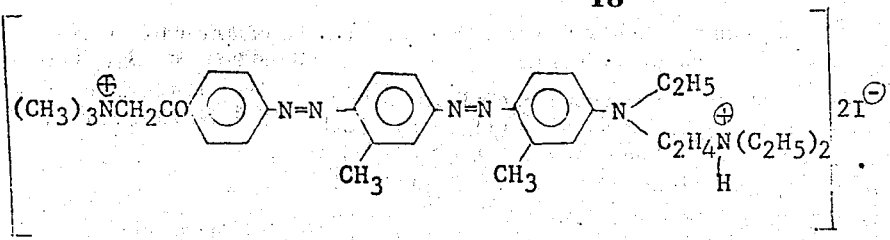

Coupling was effected by addition of 9.2 parts of the pure coupler to the diazonium salt solution at 10°–15°C. The reaction mixture was stirred at this temperature for 3 hours and then at room temperature overnight.

The pH of the reaction mass was then adjusted to 5.0 with 30% caustic soda solution. 11.5 Parts of sodium iodide were added and the mass was heated to 40°–45°C. and then stirred at room temperature overnight.

Filtration yielded solids which were reslurried in 200 parts of 1% sodium iodide solution. The dye was reisolated by filtration, washed with 50 parts of 1% sodium iodide, reslurried in 50 parts of isopropanol, reisolated, washed with 50 parts of isopropanol and dried. The red-brown powder had an absorptivity of 35.0 liters gram$^{-1}$ cm.$^{-1}$ at 525 m$\mu$.

Based on the above procedure, the dye has the structure:

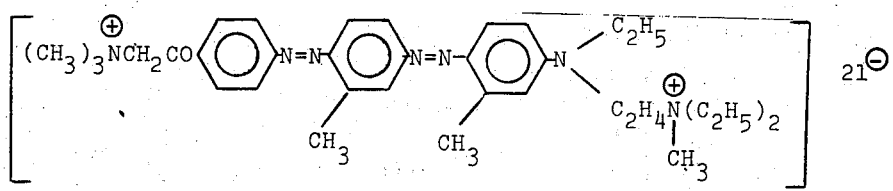

b. Diazotization and coupling of 17.2 parts of the monoazo intermediate of Example 8 (b) was performed essentially as described in (a) above, yielding a dark, olive-green powder having an absorptivity of 60.5 liters gram$^{-1}$ cm.$^{-1}$ at 563 m$\mu$.

Based on the above procedure, the structure of the dye is:

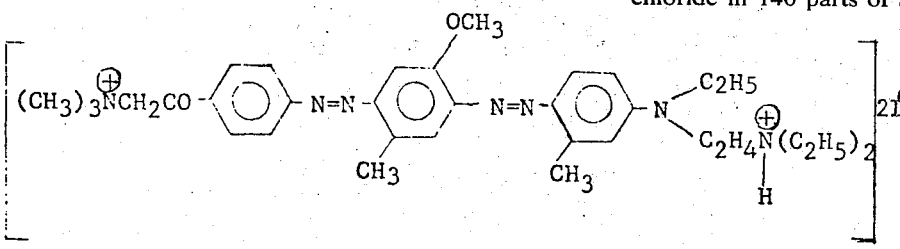

c. The procedure of Example 9 (a), using the monoazo intermediate of Example 8 (c), produced a dye having an absorptivity of 43.0 liters gram$^{-1}$ cm.$^{-1}$ at 523 m$\mu$.

Based on the above procedure, the structure of the dye is:

EXAMPLE 10

Quanternization of the Dye of Example 9 (c)

Quaternization of 10 parts of the dye of Example 9 (c) with 21.5 parts of methyl iodide, using the procedure of Example 4, produced a dark reddish-brown powder having an absorptivity of 43.3 liters gram$^{-1}$ cm.$^{-1}$ at 510 m$\mu$. Based on the above procedure, the structure at the dye is:

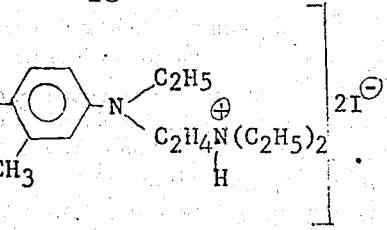

EXAMPLE 11

Preparation of (4-Amino-3-chlorophenacyl)trimethylammonium Chloride ("o-Chloroquatamine")

a. m-Chloro-p-acetylaminophenacyl Chloride

A solution of 18.75 parts of p-acetylaminophenacyl chloride in 140 parts of acetic acid and 32.5 parts of concentrated hydrochloric acid was cooled to 0°–5°C. A solution of 4.4 parts of sodium chlorate in 10 parts of water was added dropwise and allowed to react at room temperature for three hours. The product was isolated by filtration and washed with bisulfite solution and then with water. It was then recrystallized from an acetone-water mixture to yield 9.7 parts of product, m.p. 182°–184°; ir (Nujol) 3,400 (N-H) and 1,690 cm.$^{-1}$ (C=O). Anal. Calc'd for $C_{10}H_9Cl_2NO_2$(246): C, 48.8; H, 3.7; Cl, 28.7; N, 5.7. Found: C, 49.1, 49.3; H, 3.9, 4.0; Cl, 28.3, 28.4; N, 5.8, 5.8.

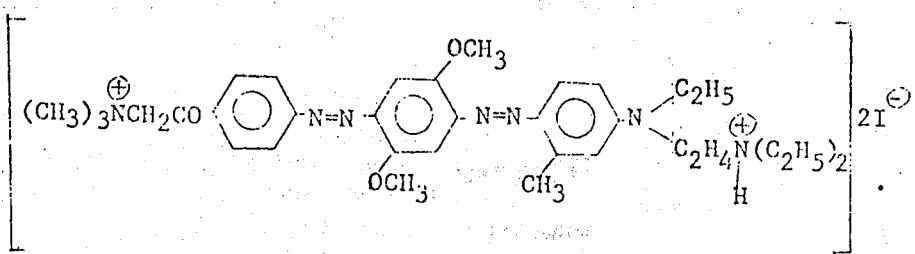

b. (4-Acetylamino-3-chlorophenacyl)trimethylammonium Chloride 9.7 Parts of m-chloro-p-acetylaminophenacyl chloride was added to 225 parts of acetone and reacted with excess trimethyl amine. Product was recovered by filtration to yield 11.6 parts, m.p. 212°–214°C.; ir (Nujol) 3300 (N-H) and 1670 cm.$^{-1}$ (C=O). Anal. Calc'd for $C_{13}H_{18}Cl_2N_2O_2$(305): C, 51.1; N, 5.9; Cl, 23.3; N, 9.2. Found: C, 49.6, 49.7; H, 5.9, 6.0; Cl, 21.5, 22.0; N, 8.9, 8.9.

c. "o-Chloroquatamine"

11.1 Parts of (4-acetylamino-3-chlorophenacyl)-trimethylammonium chloride were heated in 90 parts of water and 81 parts of concentrated hydrochloric acid at reflux. The aqueous reaction solution had 5.12% diazotizable compound by weight (100% yield).

EXAMPLE 12

Coupling of "o-Chloroquatamine" to [2-(N-ethylanilino)ethyl]trimethylammonium Chloride Diazotization of 13.2 parts of "o-chloroquatamine" was effected by a conventional procedure. The diazo solution was added to a solution of 12.5 parts of the coupler in 60 parts of water at 5°–10°C. The pH was adjusted to 4–4.5 with sodium acetate, as required. After stirring for ½ hour, the temperature was allowed to rise and the reaction mixture was stirred at room temperature for 1 hour. It was then warmed to 35°C. and 25 parts of sodium fluoroborate were slowly added. Precipitation of the dye started immediately.

After stirring overnight, the solids were isolated by filtration, washed with 5% sodium fluoroborate solution, then with isopropanol, and dried. The dye had an absorptivity of 52.1 liters gram$^{-1}$ cm.$^{-1}$ at 478 mµ. Found: C, 46.5, 46.4; H, 5.8, 5.8; N, 11.0, 11.0; Azo N, 4.6, 4.6. Calc'd for $C_{24}H_{36}B_2ClF_8N_5O$: C, 46.6; H, 5.9; N, 11.4; Azo N, 4.5.

The structure of the dye is:

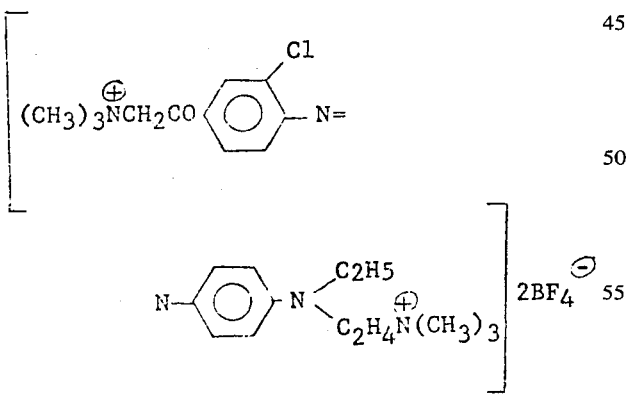

EXAMPLE 13

Coupling of "o-Chloroquatamine" to [2-(N-ethyl-m-toluidino)ethyl]diethylmethylammonium methosulfate Diazotization of 13.2 parts of "o-chloroquantamine" and coupling to 18.9 parts of coupler were carried out essentially as described in Example 12. The dye had an absorptivity of 47.5 liters gram$^{-1}$ cm.$^{-1}$ at 490 mµ. Found: C, 48.1, 48.0; H, 6.1, 6.1; N, 10.4, 10.3; Azo N, 4.4, 4.3. Calc'd for $C_{27}H_{42}B_2ClF_8N_5O$: C, 49.5; H, 6.4; N, 10.7; Azo N, 4.3. The dye has the structure:

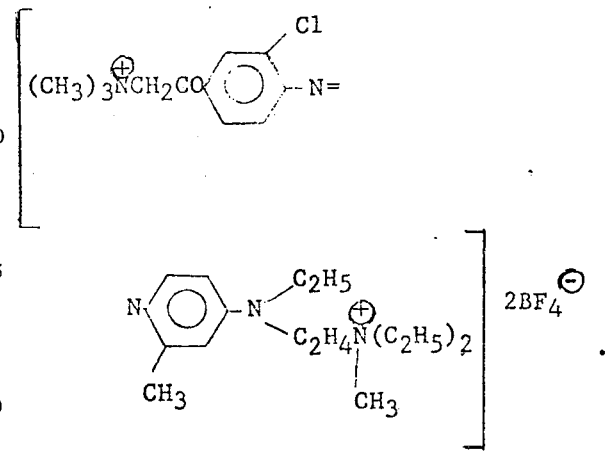

EXAMPLE 14

Coupling of "o-Chloroquatamine" to N-ethyl-N-(m-tolyl)-N',N'-diethyl-2-hydroxy-1,3-propylenediamine Diazotization of 13.2 parts of "o-chloroquatamine" and coupling to 13.7 parts of coupler was carried out essentially as described in Example 12, except that acetic acid was also added to dissolve the coupler prior to addition of the diazo compound. The dye was salted from solution with sodium chloride. The dye had an absorptivity of 58.2 liters gram$^{-1}$ cm.116$^{1}$ at 513 mµ. Found: C, 52.3, 52.6; H, 6.9, 6.9; N, 11.1, 11.2; Azo N, 4.8, 5.0. Calc'd for $C_{26}H_{40}Cl_3N_5O_2$: C, 55.7; H, 7.1; N, 12.5; Azo N, 5.0. The dye has the structure:

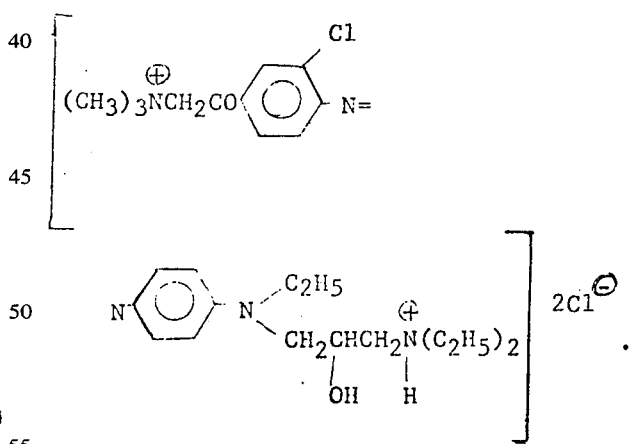

EXAMPLE 15

Coupling of "Quatamine" to [2-(N-ethyl-m-toluidino)ethyl]diethylmethylammonium methosulfate When 13.2 parts of "o-chloroquatamine" were replaced by 11.4 parts of "Quatamine" in the procedure of Example 12, a dye was obtained which was salted out of solution with sodium iodide, isolated by filtration, washed with water and dried. The reddish-orange powder had an absorptivity of 45.6 liters gram$^{-1}$ cm.$^{-1}$ at 469 mµ. Based on the above procedure, the dye has the structure:

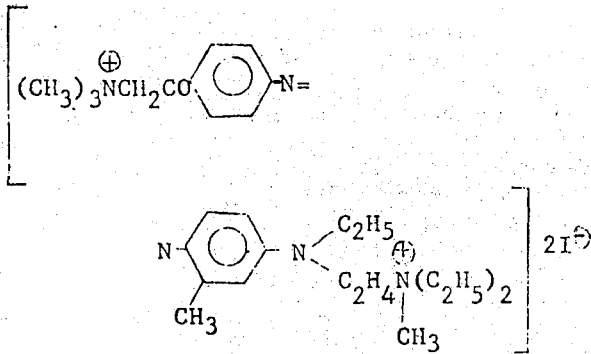

The dyes of Examples 1-7, 9, 10 and 12-16 were applied to.

EXAMPLE 16

Preparation of Two Dyes from p-(4-aminonaphthylazo)phenacylammonium Chloride

A mixture of 41.9 parts of p-(4-aminonaphthylazo)-phenacylammonium chloride, 300 parts of water, 50 parts of acetic acid and 11.6 parts of 10N-hydrochloric acid was cooled to 20°C. and 34.2 parts of 5N-sodium nitrite were slowly added. After stirring for 30 minutes at 20°C., excess nitrite was destroyed with a small quantity of sulfamic acid. The diazonium salt solution was cooled to 15°C. and divided into two equal parts.

a. To one half of the diazo solution was added a solution of 11.4 parts of N-ethyl-N-phenyl-N',N'-diethylethylenediamine in 25 parts of water and 10 parts of acetic acid. After stirring at 15°C. for 2 hours, the reaction mixture was allowed to warm up to room temperature over a 1-hour period. The pH was adjusted to 3.2±0.5 with sodium acetate and the mass was heated to 40°–45°C. with stirring. A solution of 10.8 parts of sodium iodide in 150 parts of water was added and the mixture stirred overnight. The mother-liquor was then decanted and the oily dye was triturated in 250 parts of 1% sodium iodide solution. The resulting slurry was then heated at 30°–40°C. for 1 hour and the solids isolated by filtration and dried. Yield: 25.5 parts. The dye had an absorptivity of 30.9 liters gram$^{-1}$ cm.$^{-1}$ at 545 mμ.

Based on the above procedure, the structure of the dye is

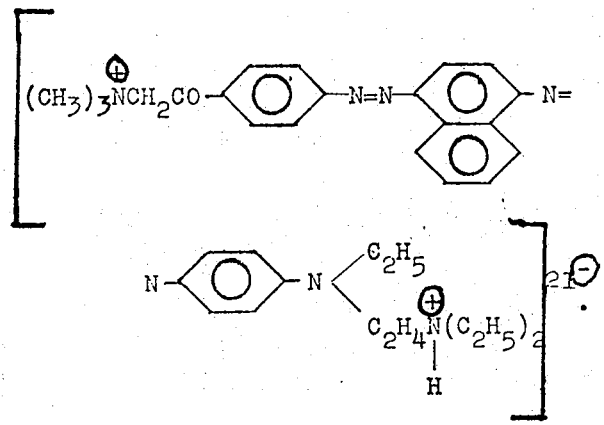

b. The procedure described in (a) above was repeated, except that N-ethyl-N-phenyl-N',N'-diethylethylenediamine was replaced with an equivalent amount of N-ethyl-N-(m-tolyl)-N',N'-diethylethylenediamine. The product was precipitated from solution with sodium chloride, isolated by filtration, reslurried in 100 parts of water for 1 hour and reisolated by filtration. The solids were washed in turn with 10%, 5% and then 1% sodium chloride solution and dried. Yield: 14.5 parts. The dye had an absorptivity of 59.9 liters gram$^{-1}$ cm.$^{-1}$ at 570 mμ. Based on the above procedure, the structure of the dye is

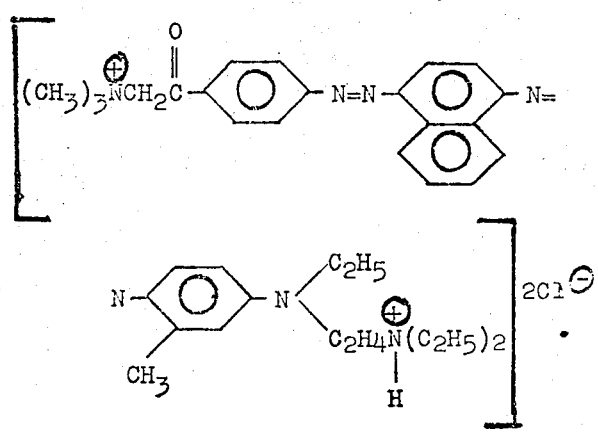

The following examples illustrate the dyeing methods for banded test carpet prepared as described on page 15 above. In order to demonstrate the reserve of the biscationic dyes on unmodified nylon, they were dyed in the absence of acid dyes onto the banded nylon carpeting. The carpeting contained acid-modified, "medium-dyeable" and "ultra-deep-dyeable" BCF nylon fibers tufted in a random pattern on a non-woven polypropylene backing.

EXAMPLE 17

Dyeing of Banded BCF Nylon Carpeting a. Bleach Scour

100 Parts of the carpeting described above were heated for 5 minutes at 80°F. in 4000 parts of water containing

| | | |
|---|---|---|
| sodium perborate | 4 | parts |
| trisodium phosphate | 0.25 | part |
| a sulfobetaine* | 0.5 | part |

\* $\overset{\oplus}{\text{R-N-CH}_2\text{CH}_2\text{CH}_2\text{SO}_3}^{(-)}$ with CH$_2$CH$_2$OH groups, where
R = C$_{16}$ alkyl (~ 30%)
C$_{18}$ alkyl (~ 30%)
C$_{18}$ mono-unsaturated (~ 40%).

The temperature was raised to 160°F. for 15 minutes and the carpet rinsed in water at 100°F.

b. Dyeing Procedure

The carpeting was added to 4000 parts of water containing

| | | |
|---|---|---|
| the aforementioned sulfobetaine | 1 | part |
| the tetrasodium salt of ethylenediamine tetraacetic acid | 0.25 | part |
| tetrasodium pyrophosphate | 0.2 | part. |

The dyebath was adjusted to pH 6 with monosodium phosphate and the temperature raised to 80°F. for 10 minutes. 0.05 Part of the dye of Example 1 was added and, after holding the dyebath of 80°F. for 10 minutes, the temperature was raised at ca. 2°F. per minute to 210°F. and held at this temperature for 1 hour. The carpeting was rinsed in cold water and dried. The acid-modified band was dyed a scarlet shade. The unmodified fibers had a negligible stain.

EXAMPLE 18

Printing of BCF Nylon Styling Carpeting

A sample of BCF nylon styling carpeting was printed with a mixture containing

| | |
|---|---|
| the cationic dye of Example 3 | 5 parts |
| the sulfobetaine described in Example 17 | 0.5 part |
| glacial acetic acid | 5 parts |
| carrageenin thickener | to give the desired viscosity |
| water | to 100 parts |

The carpeting was steamed at 212°–220°F. for 10 minutes rinsed, scoured for 15 minutes at 160°F. in a 0.03% aqueous solution of the condensation product of 20 moles of ethylene oxide with 1 mole of $C_{18}$ alcohol, rinsed and dried. The acid-modified nylon fibers were dyed a scarlet shade. The unmodified fibers had a negligible stain.

EXAMPLE 19

Continuous Dyeing of Nylon Styling Carpeting Using Kuster's Equipment as described in "Textile Chemist and Colorist," Jan. 14, 1970, pages 6–12, nylon styling carpeting as described in Example 18 above was run through a wet-out bath at 80°F. containing

| | | |
|---|---|---|
| an organic alcohol extended with ethylene oxide | 1.5 | g/l |
| a sulfated polyglycol ether | 0.6 | g/l |

Pickup was about 80%. The carpeting was then continuously treated with an aqueous dyebath composition containing the dye of Example 2

| | | |
|---|---|---|
| composition containing the dye of Example 2 | 5 | g/l |
| an organic alcohol extended with ethylene oxide | 0.25 | g/l |
| a sulfated polyglycol ether | 1.25 | g/l |
| a purified natural gum ether | 2 | g/l |
| the sulfobetaine described in Example 17 | 5 | g/l |
| acetic acid | 3 | g/l |
| monosodium phosphate | to adjust the pH to ca. 5 | |

The dyebath temperature was 80°F. Pickup was about 200%. The carpeting was then run through a steamer at 212°F., in which the dwell time was 8 minutes. The carpeting was rinsed thoroughly and dried. The acid-modified nylon fibers were dyed an orange shade; the unmodified fibers were negligibly stained.

EXAMPLE 20

Evaluation of Cross-Staining and Light-Fastness

The dyes of Examples 1–7, 9, 10 and 12–16 were applied to skeins of acid-modified BCF nylon in the presence of skeins of "light-dyeable" unmodified BCF nylon, by the dyeing procedure described in Example 17. For comparison, a commercially available monocationic dye was used, having the structure

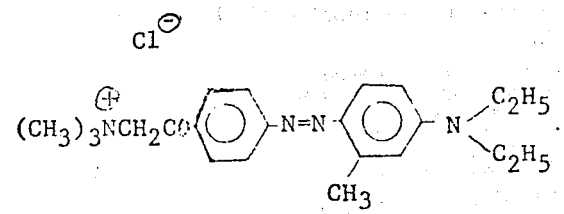

The results appear in Table 4. In each case, the shade depth on the acid-modified skein was adjusted to be visually equal to that of the monocationic dye at 0.5% (on the weight of the fiber).

Ratings of staining and light-fastness were made according to the Gray Scale, as given in the Manual of the American Association of Textile Chemists and Colorists. The numbers have the following significance:

5 = negligible or no change (or stain)
4 = slight change (or stain)
3 = noticeable change (or stain)
2 = considerable change (or stain)
1 = much change (or stain)
W = weak Table 4

| Example | Shade | Stain on unmodified "Light-Dyeable" Nylon | Light-Fastness on Acid-Modified Nylon - 80 hours Xenon Arc Fade-Ometer |
|---|---|---|---|
| Commercial dye | red | 3–2 | 5–4W |
| 1 | red | 5–4 | — |
| 2 | orange | 4–3 | — |
| 3 | scarlet | 5 | 5–4W |
| 4 | scarlet | 5 | 5–4W |
| 5 | scarlet | 5 | 5–4W |
| 6 | orange | 4–3 | — |
| 7 | yellow | 5–4 | — |
| 9(a) | maroon | 4 | — |
| 9(b) | violet | 5 | — |
| 9(c) | maroon | 5–4 | 4–3W |
| 10 | maroon | 5–4 | 4W |
| 12 | orange | 5–4 | 5–4W |
| 13 | scarlet | 5–4 | 5–4W |
| 14 | maroon | 5–4 | 5–4W |
| 15 | orange | 5 | 5–4W |
| 16(a) | violet | 4 | 3–2Y,W |
| 16(b) | blue-violet | 4 | 4W, 3R |

The embodiments of the invention in which an exclusive property or privilege is claimed are defined as follows:

1. In a process for dyeing nylon styling yarns comprising contacting said yarns with a dye dispersed in an aqueous dyebath having a pH of from 3 to 9 and a temperature of about from 70° to 100°C. and containing about from 0.05 to 0.5% based on the weight of the yarn of a dyeing assistant, the improvement comprising using a biscationic azo dye having the formula:

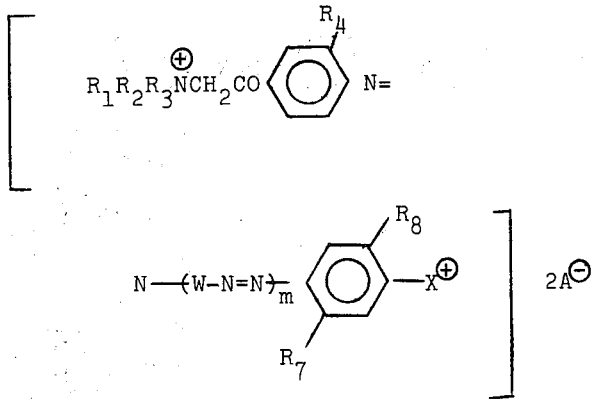

where
$R_1$ is alkyl
$R_2$ is alkyl or hydroxyalkyl
$R_3$ is alkyl, hydroxyalkyl or banzyl or $R_2$ and $R_3$ together is piperidinium or pyrrolidinium
or $R_1$, $R_2$, and $R_3$ together is pyridinium $R_4$ is H or Cl W is 1,4-naphthylene or 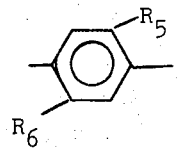, $R_5$ and $R_6$ is H, alkyl, alkoxy or Cl
$R_7$ is H, alkyl, alkoxy, Cl NHCO alkyl or $NHCOC_6H_5$
$R_8$ is H, Cl, alkyl or alkoxy

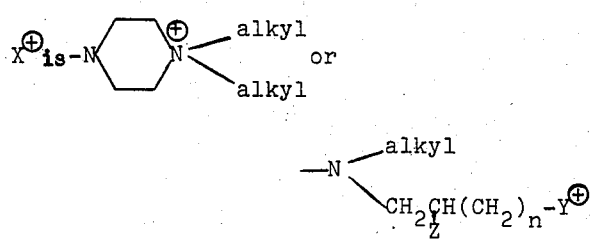

$Y^\oplus$ is $^\oplus NR_9R_2R_3$ or $NHCOCH_2^\oplus NR_9R_2R_3$, where $R_9$ is $R_1$ or H $m$ is 0 or 1

$n$ is 0 or 1

Z is H when $n = 0$ and OH when $n = 1$ $A^\ominus$ is anion and where each alkyl, alkoxy and hydroxyalkyl contains 1 to 4 carbon atoms; at a pH of from 6 to 6.5.

2. The improved process of claim 1 wherein $R_1$ is $CH_3$, $R_2$ is $CH_3$, $R_3$ is $CH_3$, $R_4$ is H, m is 0, $R_7$ is $CH_3$, $R_8$ is H and

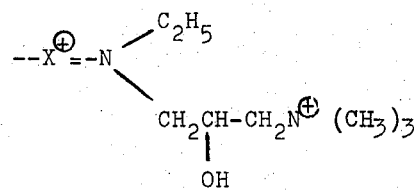

* * * * *

UNITED STATES PATENT OFFICE
CERTIFICATE OF CORRECTION

PATENT NO. : 3,904,358
DATED : September 9, 1975
INVENTOR(S) : Daniel Shaw James It is certified that error appears in the above-identified patent and that said Letters Patent are hereby corrected as shown below:

On the title page, the date of issue should read --September 9, 1975--.

Column 25, line 13, a comma should be inserted between "Cl" and "NHCO".

Column 26, line 6, the equal signs should be changed to --is--.

Column 26, line 17, the formula should read:

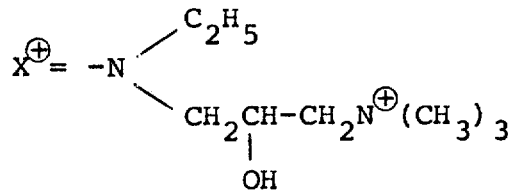

Signed and Sealed this ninth Day of March 1976

[SEAL]

Attest:

RUTH C. MASON
Attesting Officer

C. MARSHALL DANN
Commissioner of Patents and Trademarks